(12) United States Patent
Keeton et al.

(10) Patent No.: US 8,283,283 B2
(45) Date of Patent: Oct. 9, 2012

(54) THERMAL LABELS

(75) Inventors: Mark E. Keeton, Kettering, OH (US); Paul C. Blank, LaCrosse, WI (US); Timothy W. Rawlings, Waynesville, OH (US); David Jarvis, Rutland (GB)

(73) Assignee: NCR Corporation, Duluth, GA (US)

( * ) Notice: Subject to any disclaimer, the term of this patent is extended or adjusted under 35 U.S.C. 154(b) by 783 days.

(21) Appl. No.: 12/342,463

(22) Filed: Dec. 23, 2008

(65) Prior Publication Data

US 2010/0160159 A1    Jun. 24, 2010

(51) Int. Cl.
*B41M 5/30* (2006.01)
*B41M 5/42* (2006.01)

(52) U.S. Cl. .................................... 503/200; 503/226

(58) Field of Classification Search .................. None
See application file for complete search history.

(56) References Cited

U.S. PATENT DOCUMENTS

| | | | | |
|---|---|---|---|---|
| 5,342,649 A | * | 8/1994 | Sarokin | 427/150 |
| 6,071,851 A | * | 6/2000 | Wakamatsu | 503/200 |
| 6,479,431 B1 | * | 11/2002 | McFall et al. | 503/200 |
| 6,861,388 B2 | * | 3/2005 | Ishibashi et al. | 503/200 |
| 7,846,871 B2 | * | 12/2010 | Wagner et al. | 503/226 |

\* cited by examiner

*Primary Examiner* — Bruce H Hess
(74) *Attorney, Agent, or Firm* — Dana T. Hustins (57) ABSTRACT

A direct thermal label and methods of making thereof are provided. In one embodiment, a direct thermal label comprising a first substrate and a thermal barrier coating is provided, wherein the first substrate has a thermally sensitive coating situated over the thermal barrier coating on at least a first side thereof.

14 Claims, 9 Drawing Sheets

THERMAL LABELS

BACKGROUND

Direct thermal printing of documents such as transaction documents and receipts is described in U.S. Pat. Nos. 6,784,906 and 6,759,366, the entire contents of which are incorporated herein by reference. In direct thermal printing, a printer is configured to allow printing on one or both sides of thermal media moving along a feed path through the printer. In such printers a direct thermal print head is disposed on one or both sides of the media along the feed path for selectively applying heat to paper or other media comprising a substrate with a thermally sensitive coating. The coating changes color when heat is applied, by which "printing" is provided on the coated substrate. For two-sided direct thermal printing, the media substrate may be coated on, and heat may be applied to, both media sides.

SUMMARY

Imaging elements for direct thermal printing are described generally comprising one or more substrates and a thermally sensitive coating on at least one side thereof.

In one embodiment, a direct thermal label is provided comprising a first substrate having a first thermally sensitive coating on at least a first side thereof, and one or more thermal barrier coatings, wherein a thermal barrier coating is provided between the first substrate and the first thermally sensitive coating.

The direct thermal label may further comprise a second substrate, which second substrate may have a second thermally sensitive coating on at least a first side thereof, and wherein a thermal barrier coating may optionally be provided between the second substrate and the second thermally sensitive coating. Further, one or more of the one or more thermal barrier coatings of the direct thermal label may comprise a flexible polymer, and/or a thermal insulator, wherein the flexible polymer may comprise, for example, latex, and the thermal insulator may comprise, for example, one or more hollow spheres.

Additionally, the first substrate may further include a thermally sensitive coating on a second side thereof, and a thermal barrier coating may be provided between the thermally sensitive coating on the second side of the first substrate and the first substrate. Likewise, where provided, the second substrate may further include a thermally sensitive coating on the second side thereof, and a thermal barrier coating may be provided between the thermally sensitive coating on the second side of the second substrate and the second substrate.

Further, the direct thermal label may further comprise a first adhesive, wherein the second side of the first substrate may be releasably attached to the second side of the second substrate via the first adhesive. Also, the direct thermal label may further comprise a release agent, wherein the release agent may be secured to the second side of the second substrate.

The direct thermal label may also comprising a third substrate, wherein a first side of the third substrate may be releasably attached to a second side of the first substrate, and a second side of the third substrate may be fixably attached to a second side of the second substrate. Alternately, a first side of the third substrate may be releasably attached to a second side of the first substrate and a second side of the third substrate may be releasably attached to a second side of the second substrate.

Where provided, the third substrate may also include a third thermally sensitive coating on at least a first side thereof, and/or on a fourth thermally sensitive coating on a second side thereof.

Further, the first substrate may comprise glassine, and the second substrate may comprise vellum.

In another embodiment, a direct thermal label may comprise a first substrate having a first thermally sensitive coating on at least a first side thereof, and one or more thermal barrier coatings, wherein a thermal barrier coating is provided on at least a second side of the first substrate. Such direct thermal label may further comprise a second substrate, which second substrate may have a second thermally sensitive coating on at least a first side thereof and/or a thermal barrier coating on a second side thereof.

Further, one or more of the one or more thermal barrier coatings may comprise a flexible polymer, and/or a thermal insulator. The flexible polymer may comprise, for example, latex and the thermal insulator may comprise, for example, one or more hollow spheres.

Additionally, such direct thermal label may further comprise a first adhesive, wherein the second side of the first substrate is releasably attached to the second side of the second substrate via the first adhesive. The direct thermal label may also further comprise a release agent, wherein the release agent is secured to the second side of the first substrate above and via the thermal barrier coating.

The direct thermal label may also comprise a third substrate, wherein a first side of the third substrate may be fixably attached to the second side of the first substrate, and a second side of the third substrate may be releasably attached to a second side of the second substrate. Further, the third substrate may include a third thermally sensitive coating on at least the second side thereof.

The first substrate of the direct thermal label may comprise glassine, and the second substrate may comprise vellum.

According to a further embodiment, a method of making a direct thermal label is also provided wherein the method may comprise applying a thermal barrier coating to a first side of a first substrate, and applying a thermally sensitive coating over the thermal barrier coating. In addition, a release agent may be applied to a second side of the first substrate, and a first adhesive may be applied over the release agent on the second side of the first substrate.

The method may further comprise securing a second side of a second substrate to the first adhesive, where a first side of the second substrate may include a thermally sensitive coating.

In addition, a second adhesive may be applied to a first side of the second substrate, and a second side of a third substrate may be secured to the second adhesive. Further, a first side of the third substrate may include a thermally sensitive coating.

According to yet another embodiment, a method of making a direct thermal label is provided wherein the method may comprise applying a thermal barrier coating to a second side of a first substrate having a thermally sensitive coating on at least a first side thereof, and applying a release agent and/or an adhesive over the thermal barrier coating. A second side of a second substrate may also be releasably attached to the second side of the first substrate, wherein the second substrate may include a thermally sensitive coating on at least a first side thereof. The first and/or the second substrates may also include thermally sensitive coatings on the respective second sides thereof. Additionally, the release agent, adhesive and/or thermal barrier coating may be dried using a radio frequency dryer.

Alternative features, advantages and variations are disclosed with respect to the detailed description to follow, and the appended drawings and claims.

DETAILED DESCRIPTION

By way of example, various embodiments of the invention are described in the material to follow with reference to the included drawings. Variations may be adopted.

Figure 1:
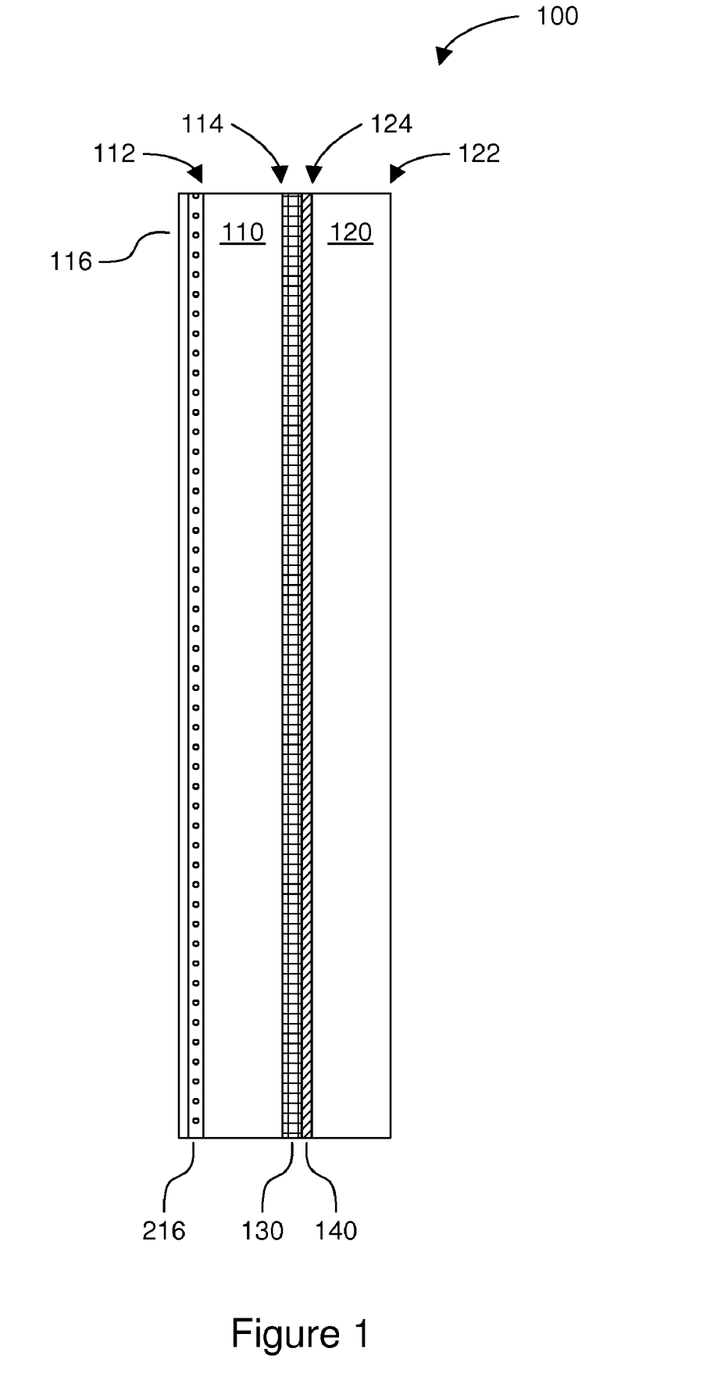
FIG. 1 illustrates a one-sided thermal label.

FIG. 1 illustrates a one-sided thermal label 100. The one-sided thermal label 100 of FIG. 1 may be prepared for direct use and/or as a component of a two-sided thermal label 200, 300 as illustrated in, for example, FIGS. 2A, and 2B, and FIGS. 3A, 3B and 3C.

As shown in FIG. 1, a one-sided thermal label 100 may comprise one or more thermally sensitive coatings 116 proximate to a first side 112 of a first substrate 110. In addition, a one-sided thermal label 100 may comprise one or more adhesives and/or adhesive layers 130 (including but not limited to one or more solvent based, water-based, hot melt, warm melt, and/or UV cured pressure sensitive adhesives) proximate to a second side 114 of the first substrate 110, and one or more release agents and/or layers 140 (including but not limited to one or more thermally and/or UV cured silicone release agents) proximate to a second side 124 of a second 120 substrate.

Where provided, the one or more adhesives and/or adhesive layers 130, and/or release agents and/or layers 140, may assist in releasably attaching the first substrate 110 to the second substrate 120 in order to form, for example, a one-sided thermal label 100, and/or a two-sided thermal label 200, 300. Likewise, use of a release agent and/or layer 140 affords an ability to utilize high tack adhesives in addition to low and/or no tack adhesives 130 for maintenance of residual tackiness or stickiness upon separation of the first and second substrates 110, 120.

Depending on the embodiment, the first and/or second substrates 110, 120 (and/or a third substrate 150 as illustrated with respect to FIGS. 3A, 3B and 3C) may comprise materials derived from synthetic and/or natural fibers such as cellulose (natural) fibers, e.g., opaque paper, and/or polyester (synthetic) fibers. A substrate 110, 120, 150 may also include plastics, e.g., extruded plastic films using materials such as polyimide, polyethylene or polyester polymers. Materials including glassine (e.g., supercalendared paper) and/or vellum (including natural and/or paper vellum) may also be used as one or more substrates 110, 120, 150.

Calendering may be provided to produce a smoothness of 75 Bekk or greater on a side of a substrate 110, 120, 150 to be thermally coated to improve thermal imaging performance of the resultant coated media. To give higher quality thermal imaging characteristics, e.g., for bar code printing, a minimum finished smoothness of 300 Bekk should be used. However, calendaring of a substrate generally reduces its porosity, and thereby decreases the ability of a subsequently applied coating, such as one or more thermally sensitive coatings, to securely bind thereto. Owing to the relative inability of the coating to be absorbed by, and thereby be anchored to, the substrate, application of a thermally sensitive coating directly to a low or no porosity substrate such as calendared and/or supercalendared (e.g., glassine) paper, and/or a polymeric (e.g., plastic) substrate (including plasticized cotton vellum), a brittle, poorly bound, and easily removed thermally sensitive film may form on a respective substrate surface, which brittle film may, therefor, easily flake off the sheet due to insufficient bonding to the substrate.

Additionally, while they may be desirable from a final image quality standpoint, highly calendared and/or other smooth, non-porous sheets may transmit heat very efficiently. This can make thermal imaging of an associated thermally sensitive coating very difficult because applied heat is efficiently transmitted away from the coating. Also, any heat applied to a back side 114 of a substrate 110 such as, for example, during application and/or drying of an adhesive 130 (such as a hot melt adhesive), during drying and/or curing of a release agent 140, such as silicone, and/or during thermal printing of thermally sensitive coating (not shown) associated with a back side 114 of a substrate 110, may efficiently transfer to a thermally sensitive coating 116 on a front side of the sheet, causing premature and/or undesired imaging thereof.

In order to mitigate the above described problems, one or more thermal barrier coatings 216 may be provided under one or more provided thermally sensitive coating 116 of a direct thermal label 100 to provide for high adhesion of the respective thermally sensitive coating 116 to a respective substrate 110, and/or inhibit heat transfer therethrough, and thereby mitigate premature and/or undesired imaging of the one or more thermally sensitive coatings 116 due to, for example, application of heat to a second side thereof.

In one embodiment, a thermal barrier coating 216 comprises a water based coating incorporating two main components. The first component may comprise a water based emulsion/solution of a flexible and/or tacky substance such as, but not limited to, a polymer (e.g., latex and/or acrylic resin). The second component may comprise a water based dispersion/solution of a thermally insulating compound and/or material such as, but not limited to, polymeric and/or hollow spheres. An example of a suitable thermally insulating material is a polymeric hollow sphere sold under the trademark ROPAQUE. Other materials and/or chemistries which may be included in a thermal barrier coating 216 include dense clays (e.g., calcined kaolin), precipitated calcium carbonate, and/or titanium dioxide, in all cases having particle sizes may ranging from 0.1 to 5 microns in diameter, and preferably being at or around 1 micron in diameter.

Depending on the embodiment, the first component may comprise as much as 95% or as little as 50% of a final thermal barrier coating 216 on a dry mass basis. Likewise, depending on the embodiment, the second component may comprise as much as 50% or as little as 5% of a final coating 216 on a dry mass basis. In a preferred embodiment, a thermal barrier coating 216 comprises approximately 80% flexible polymer (e.g., latex) and 20% thermal insulator (e.g., polymeric hollow sphere) on a dry mass basis. In another embodiment, a thermal barrier coating 216 comprises approximately 70% flexible polymer (e.g., latex), 20% thermal insulator (e.g., polymeric hollow sphere), and 10% clay (e.g., calcined kaolin) on a dry mass basis.

Inclusion of a flexible and/or tacky substance, such as latex, acrylic resin, and/or like chemistry, allows for good adhesion of a thermally sensitive coating to a non-porous surface such as a calendared paper and/or a polymeric substrate and/or film. Because of its tacky and flexible nature, the latex and/or like chemistry flexibly anchors to the substrate and thereby resists flaking during processing and/or use. In addition, it creates a surface with sufficient porosity for a thermally sensitive coating 116 to adhere to and/or "lock" into. Further, a thermal barrier coating 216 creates an appropriate surface energy (surface tension) to allow a thermally sensitive coating 116 to form a film of consistent thickness and composition, thus promoting film forming and solid molecular bonding of the thermally sensitive coating 116.

Use of a thermal barrier coating 216 may also enhance smoothness of finish of a substrate from, for example, calendaring operations. A typical smoothness achieved by calendaring of base paper without use of a thermal barrier coating 216 may be in the range of 75-150 Bekk. Calendaring subsequent to application of a thermal barrier coating 216 may, however, provide for a finished smoothness of 250-300 Bekk, or greater. Greater smoothness of finish provides for, for example, higher quality thermal imaging of an associated thermally sensitive coating 116 which is desirable for, for example, bar code printing.

The thermally insulating aspect of a thermal barrier coating 216 can beneficially act in two ways. The first is to enhance the imaging of the thermally sensitive coating. As heat is applied to a thermally sensitive coating 116 for imaging thereof, the heat transmitted through the thermally sensitive coating is stopped from further transmission, and/or is reflected back into the thermally sensitive coating, by the thermal barrier coating 216. As such, less total energy is required from a thermal print head to image the thermally sensitive chemistry and/or imaging may occur in less time. Without the insulating aspect, heat applied for imaging may be transmitted away from the thermally sensitive coating 116 into and by the substrate 110, delaying and/or adversely impacting desired thermal imaging, including the quality thereof. Additionally, such transmitted heat may adversely impact additional coatings, including without limitation one or more adhesives 130 and/or release agents 140, and/or (where provided) one or more thermally sensitive coatings (not shown) proximate to a back (second) side 114 of the substrate 110.

In preferred embodiments, a thermal barrier coating 216 provides sufficient thermal resistance to prevent heat applied proximate to a first side of the thermal barrier coating 216, such as, for example, during application, drying, curing and/or use of an additional coating, from adversely impacting a thermally sensitive 116 or other coating proximate a second side of the thermal barrier coating 216. For example, in reference to FIG. 1, a thermal barrier coating 216 may preferably have sufficient thermal resistance to prevent heat from application of, for example, a hot melt adhesive 130 to a back side 114 of a substrate 110 from prematurely thermally imaging a thermally sensitive coating 116 proximate to a front side 112 of the substrate 110. Likewise, in further reference to FIG. 1, a thermal barrier coating 216 may preferably have sufficient thermal resistance to prevent heat applied during, for example, thermal imaging of a thermally sensitive coating 116 from adversely impacting (e.g., melting) an adhesive 130 applied to a back side 114 of a substrate 110. In addition, a thermal barrier coating 216 may provide sufficient thermal resistance to prevent heat applied proximate to a first side from adversely impacting a substrate 110 proximate to a second side thereof, such as, but not limited to, oxidizing (e.g., burning) and/or melting of the substrate 110, depending on the materials used and/or characteristics thereof.

Figure 2A:
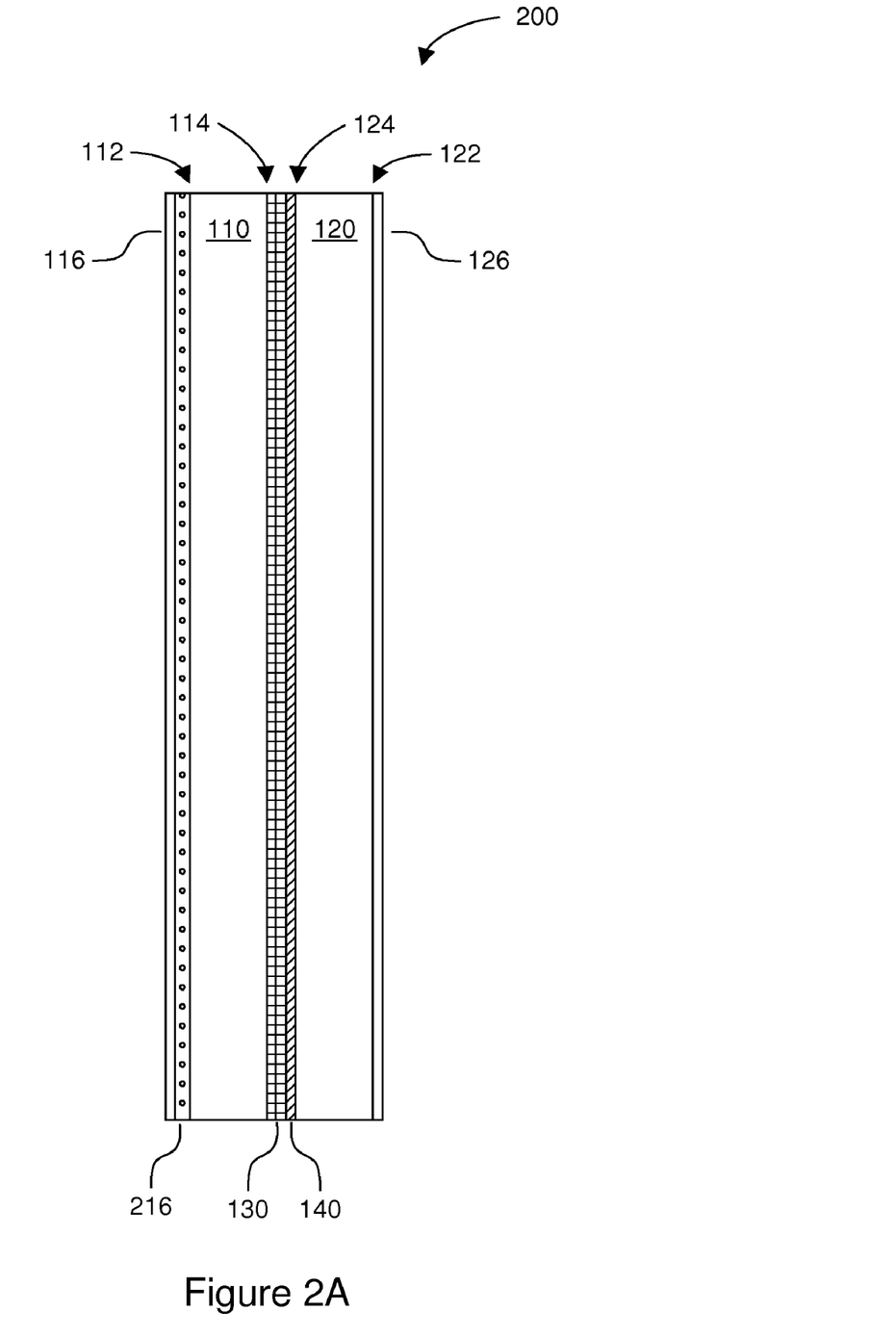
FIG. 2A illustrates a first embodiment of a two-sided thermal label.

As illustrated in FIG. 2A, one or more thermal barrier coatings 216 may be incorporated in a two-sided thermal label 200 for similar beneficial effect as with the one-sided thermal label of FIG. 1. As shown in FIG. 2A, a two-sided thermal label 200 may comprise one or more first thermally sensitive coatings 116 proximate to a first side 112 of a first substrate 110, and one or more second thermally sensitive coatings 126 proximate to a first side 122 of a second substrate 120. In addition, a two-sided thermal label 200 may comprise one or more adhesives and/or adhesive layers 130 proximate to a second side 114 of the first substrate 110, and one or more release agents and/or layers 140 proximate to a second side 124 of the second substrate 120.

As described above with respect to FIG. 1, one or more thermal barrier coatings 216 may be provided between a first substrate 110 and a first thermally sensitive coating 116 of a two-sided thermal label 200 in order to, inter alia, enhance adhesion of the first thermally sensitive coating 116 to the front side 112 of the first substrate 110 and/or prevent heat applied to a back (second) side 114 of the first substrate 110 from transmitting into the thermally sensitive coating 116 provided on the front side 112 thereof, thereby mitigating premature and/or undesirable imaging of the first thermally sensitive coating 116.

Figure 2B:
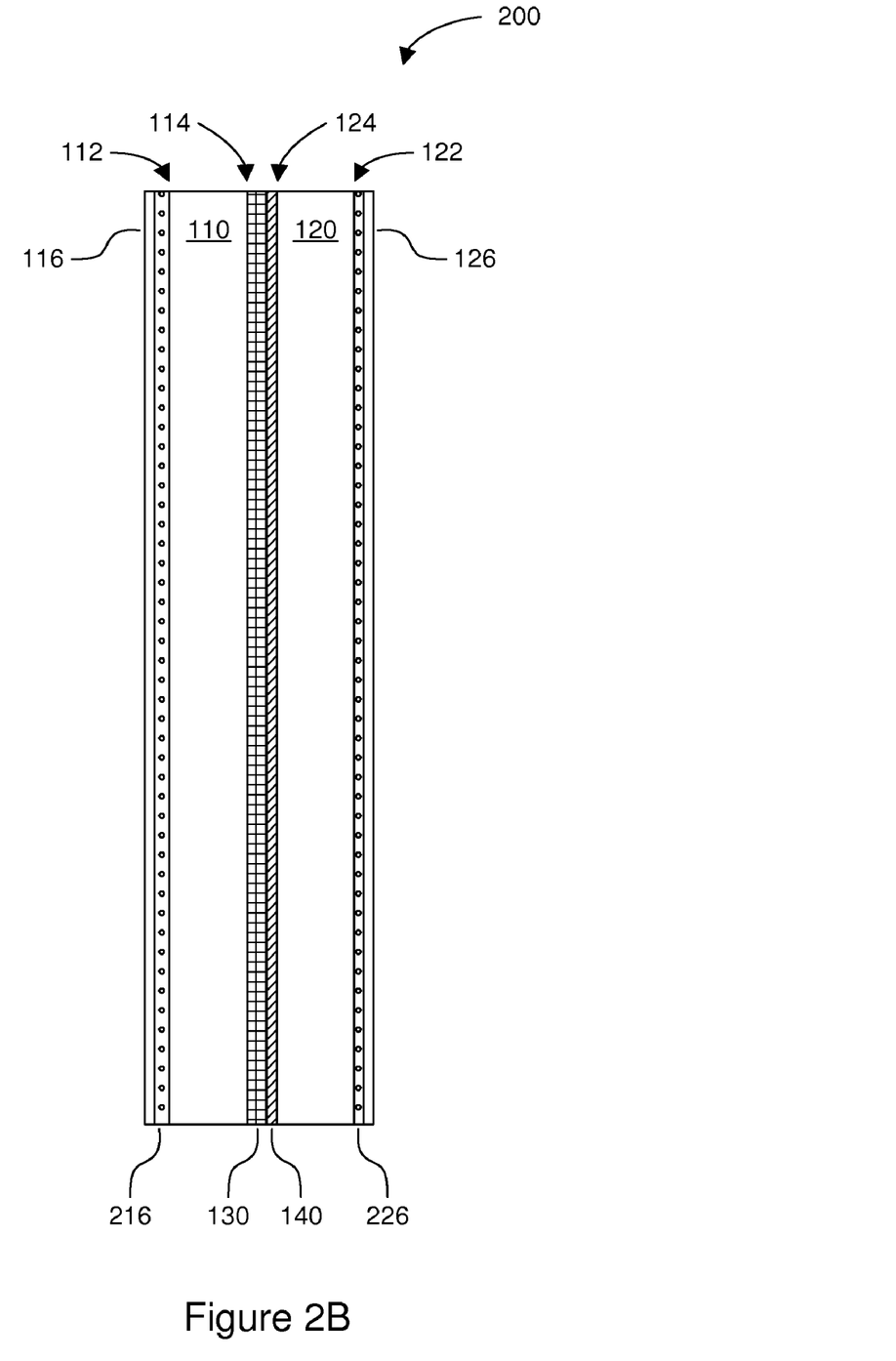
FIG. 2B illustrates a second embodiment of a two-sided thermal label.

Likewise, as illustrated in FIG. 2B, a second thermal barrier coating 226 may be provided between a second substrate 120 of a two-sided thermal label 200 and a second thermally sensitive coating 126 in order to, inter alia, enhance adhesion of the second thermally sensitive coating 126 to the front side 122 of the second substrate 110 and/or prevent heat applied to a back (second) side 124 of the second substrate 120 from transmitting into the thermally sensitive coating 126 provided on the opposite (front) side 122 thereof, thereby mitigating premature and/or undesirable imaging the second thermally sensitive coating 126. If heat were applied to the back of a substrate 110, 120, for example during the application of a hot adhesive 130 or drying/curing of a silicone release agent 140, a thermal barrier coating would act to block such heat from entering into the respective thermally sensitive coating 116, 126, thereby preventing unwanted imaging of thereof.

Figure 2C:
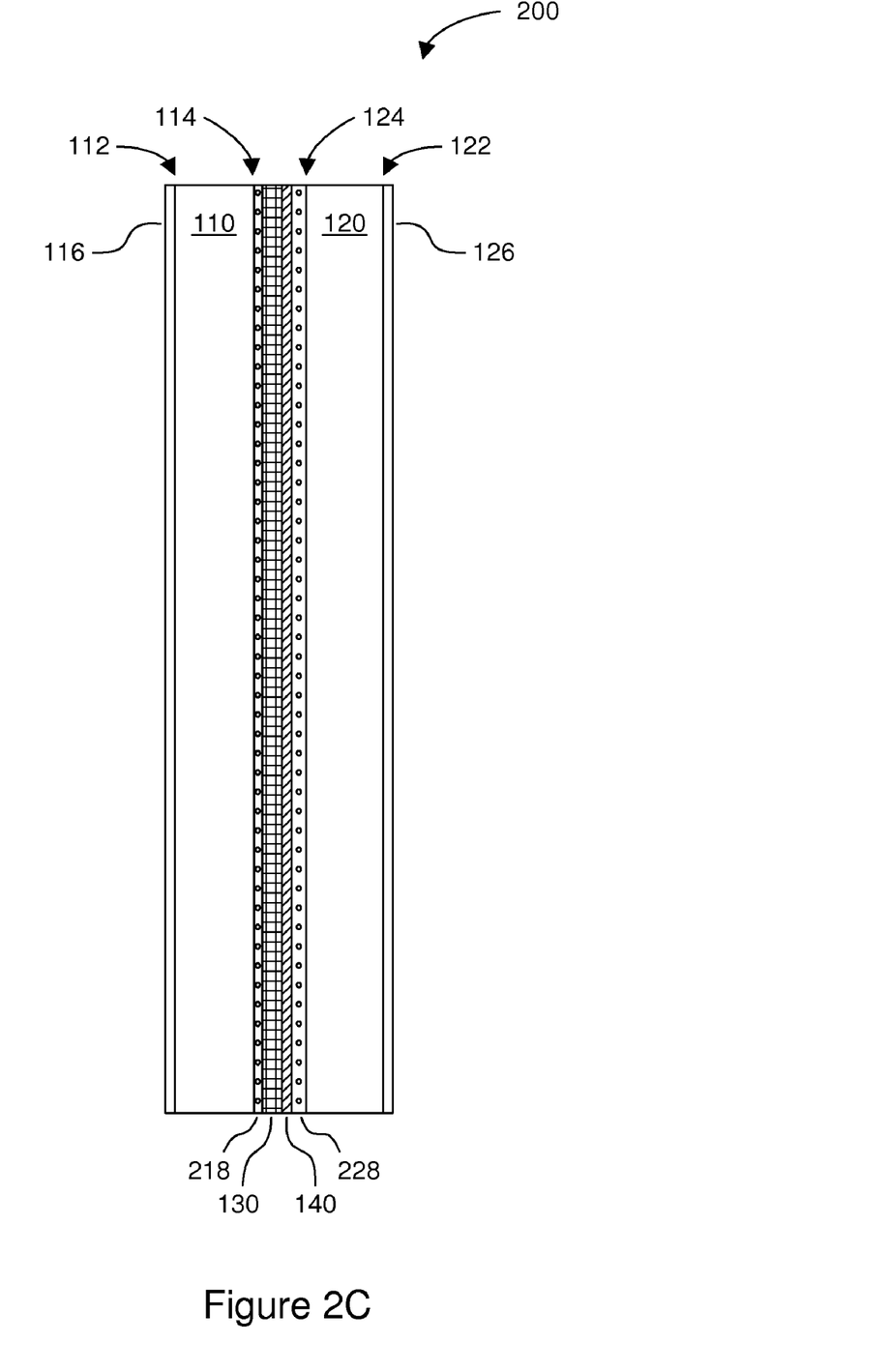
FIG. 2C illustrates a third embodiment of a two-sided thermal label.

As illustrated in FIG. 2C, a thermal barrier coating 218, 228 may be applied to a back side 114, 124 of one or both substrates 110, 120 of a two-sided thermal label 200, thereby promoting high adhesion of an associated adhesive 140 and/or release agent 130, while also acting to prevent heat applied to a respective back side 114, 124 from adversely impacting a thermally sensitive 116, 126 or other coating on a front side 112, 122 thereof. Depending on the embodiment, such back side 114, 124 thermal barrier coating 218, 228 may be provided in addition and/or in lieu of a front side 112, 122 thermal barrier coating 216, 226.

Figure 3A:
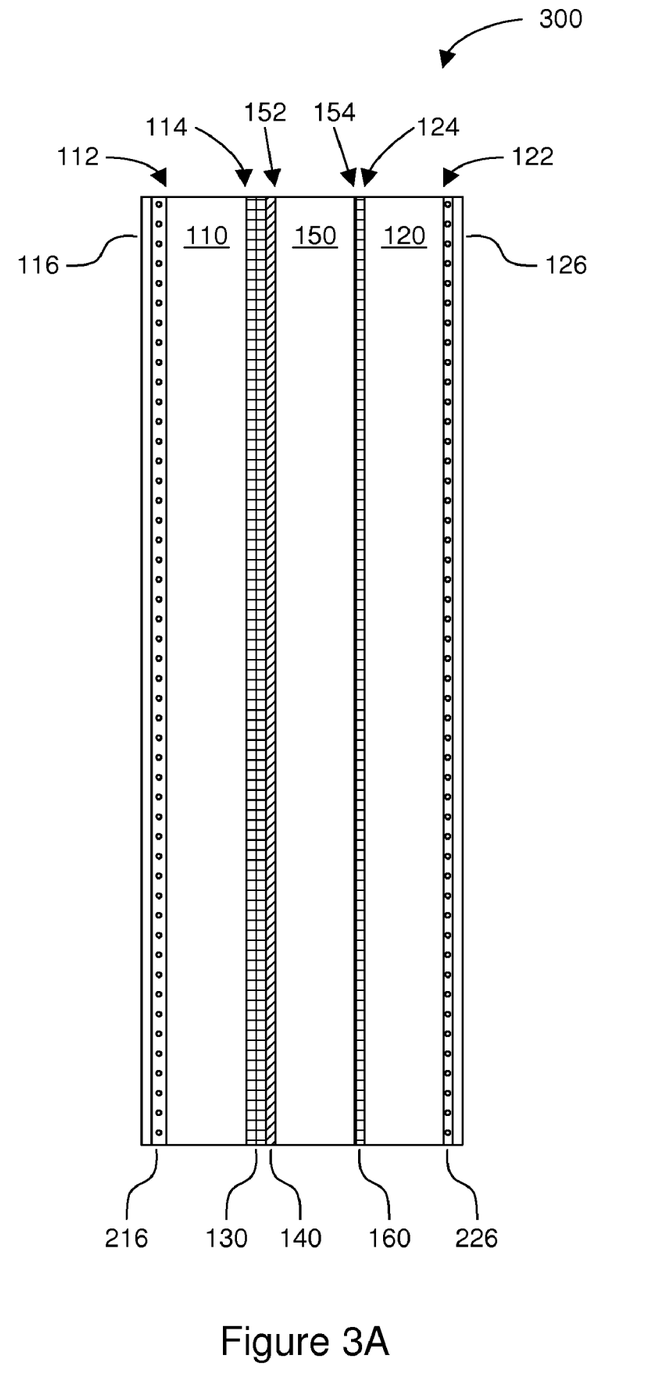
FIG. 3A illustrates a first embodiment of a three-ply, two-sided thermal label.
Figure 3B:
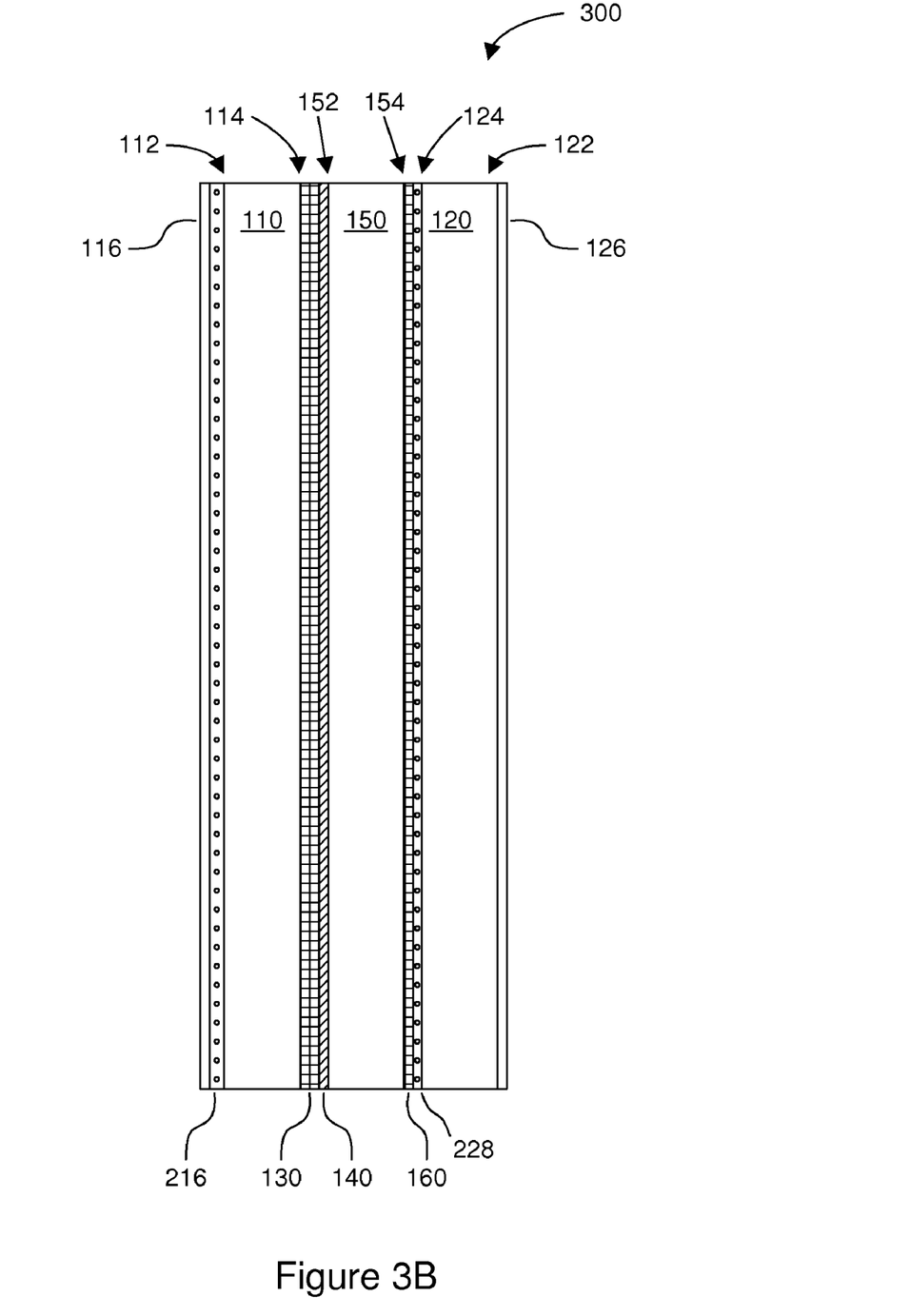
FIG. 3B illustrates a second embodiment of a three-ply, two-sided thermal label.
Figure 3C:
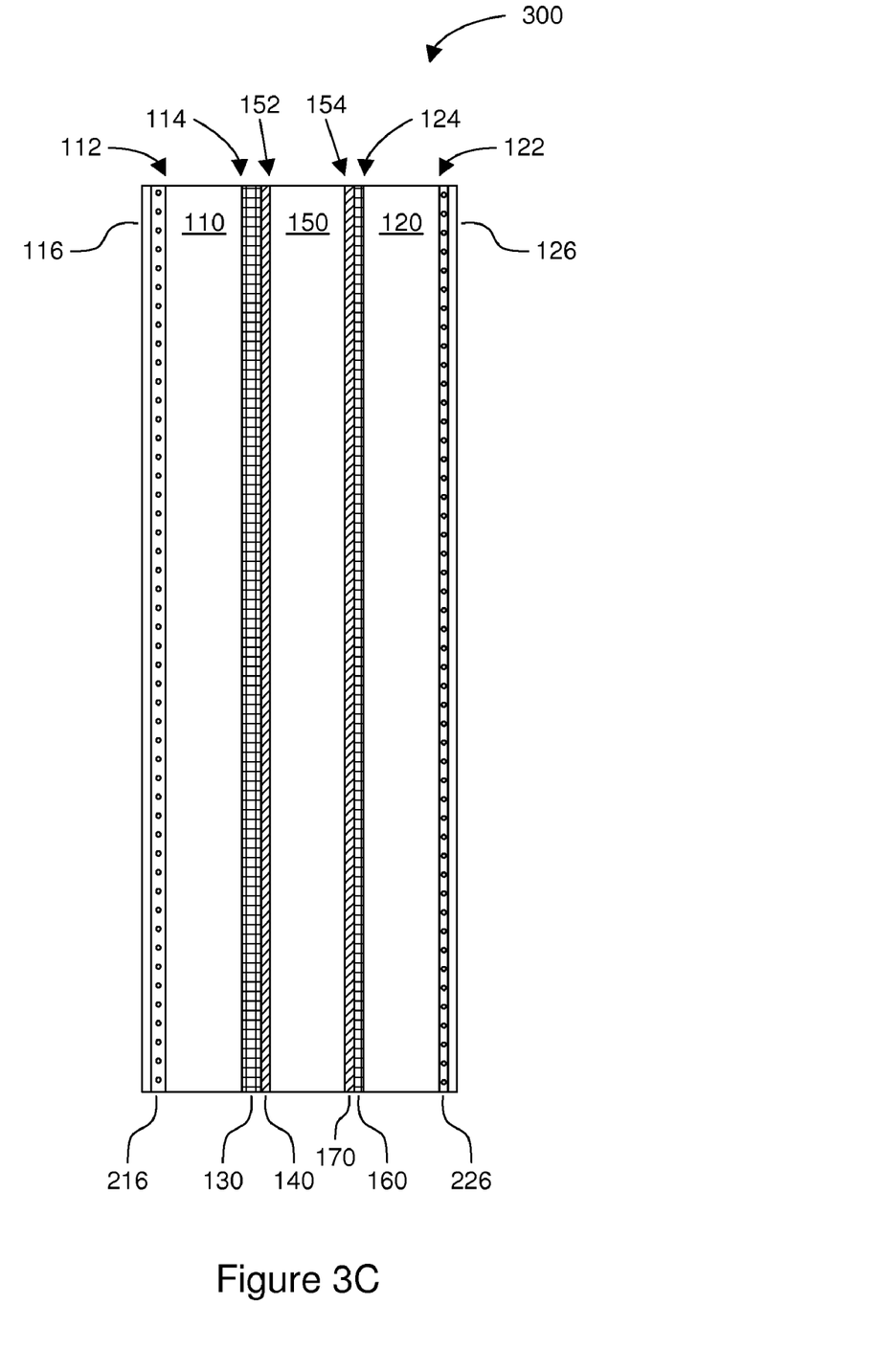
FIG. 3C illustrates a third embodiment of a three-ply, two-sided thermal label.

As shown in FIGS. 3A, 3B and 3C, a thermal barrier coating 216, 226, 228 may also be used in a two-sided thermal label 300 comprising three substrate plys: a first substrate 110, a second substrate 120, and a third substrate 150. As shown in FIG. 3A, a provided third substrate 150 may be releasably attached to a first substrate 110 via use of an adhesive 130 secured to a second side 114 of the first substrate 110, and a release agent 140 secured to a first side 152 of the third substrate 150. Likewise, a provided third substrate 150 may be fixably attached to a second substrate 120 via an adhesive 160 secured to second sides 124, 154 of both of the second 120 and third 150 substrates. In addition, and as also shown in FIG. 3A, one or more thermal barrier coatings 216, 226 may be provided proximate to respective first 116 and second 126 thermally sensitive coatings to enhance thermal imaging thereof, and mitigate issues associated with, for example, application of heat to a respective back side 114, 124 of the first 110 and second 120 substrates, such as, for example, during application of one or more hot adhesives 130, 160 thereto, and/or to enhance adhesion of the one or more provided thermally sensitive coatings 116, 126 to the respective first and second substrates 110, 120.

As shown in FIG. 3B, a provided third substrate 150 of a three-ply, two-sided thermal label 300 may be releasably attached to a first substrate 110 via use of an adhesive 130 secured to a second side 114 of the first substrate 110 and a release agent 140 secured to a first side 152 of the third substrate 150, and fixably attached to a second substrate 120 via use of an adhesive 160 secured to second sides 124, 154 of both of the second 120 and third 150 substrates. Further, like the configuration of FIG. 3A, a thermal barrier coating 216 may be provided between the first substrate 110 and a first thermally sensitive coating 116 to enhance thermal imaging and/or adhesion thereof, and mitigate issues associated with, for example, application of heat to a back side 114 of the first substrate 110. However, unlike the configuration of FIG. 3A, in the configuration of FIG. 3B a second thermal barrier coating 228 may be provided between the second substrate 120 and the adhesive 160 used to secure the second substrate 120 to the third substrate 150. In such case, the second provided thermal barrier coating 228 may still act to mitigate issues such as undesirable imaging of the second thermally sensitive coating 126 owing to, for example, application of a hot adhesive 160 to the back side 124 of the second substrate 120, and/or heat for drying/curing thereof.

It should be noted that the first thermal barrier coating 216 of FIG. 3B may alternately be provided between the back side 114 of the first substrate 110 and the first adhesive 130, and thereby continue to mitigate issues such as undesirable imaging of the first thermally sensitive coating 116 owing to, for example, application of a hot adhesive 130 to the back side 114 of the first substrate 110, and/or heat for drying/curing thereof. Likewise, in other embodiments of a three-ply, two-sided thermal label 300, a thermal barrier coating may be provided between any of the three substrates 110, 120, 150 and any associated thermally sensitive coating, adhesive, and/or release agent or other coating such as, but not limited to, the thermally sensitive coatings 116, 126, adhesives 130, 160, and release agents 140, 170 illustrated in FIGS. 3A, 3B and 3C while achieving the benefits of high adhesion thereto and low heat transmission thereby, As shown in the embodiment of FIG. 3C, releases agents 160, 170 may be secured to both a front and a back side 152, 154 of a provided third substrate 150, permitting removal of either or both of the first and second substrates 110, 120 therefrom, and thereby creating two, separable, thermally sensitive labels portions for subsequent use/adhesion. According to one method of use, a three-ply, two-sided thermal label 300, such as that illustrated by FIG. 3C, may be substantially simultaneously thermally imaged on both exposed sides comprising the first and second thermally sensitive coatings 116, 126, thereby contemporaneously creating two, separable, imaged label portions. In an alternate embodiment, one of the exposed sides comprising one of the thermally sensitive coatings 116, 126 of a three-ply, two-sided thermally sensitive label 300, such as that of FIG. 3C, may be thermally imaged and removed from the three-ply laminate 300, with the other side 126, 116 being thermally imaged subsequent to removal of the imaged label portion (substrate, thermally sensitive coating, and adhesive). In such fashion, one or more one-sided direct thermal printers may be used to sequentially image both sides of the three-ply, two sided thermal label 300.

In other embodiments, one or more thermally sensitive coatings (not shown) may be secured to one or both sides 152, 154 of a provided third substrate 150, and below any associated release agents 140, 170, in order to permit direct thermal imaging of one or both sides of the third substrate 150, and thereby maximize use of the utilized substrates/materials.

Figure 4:
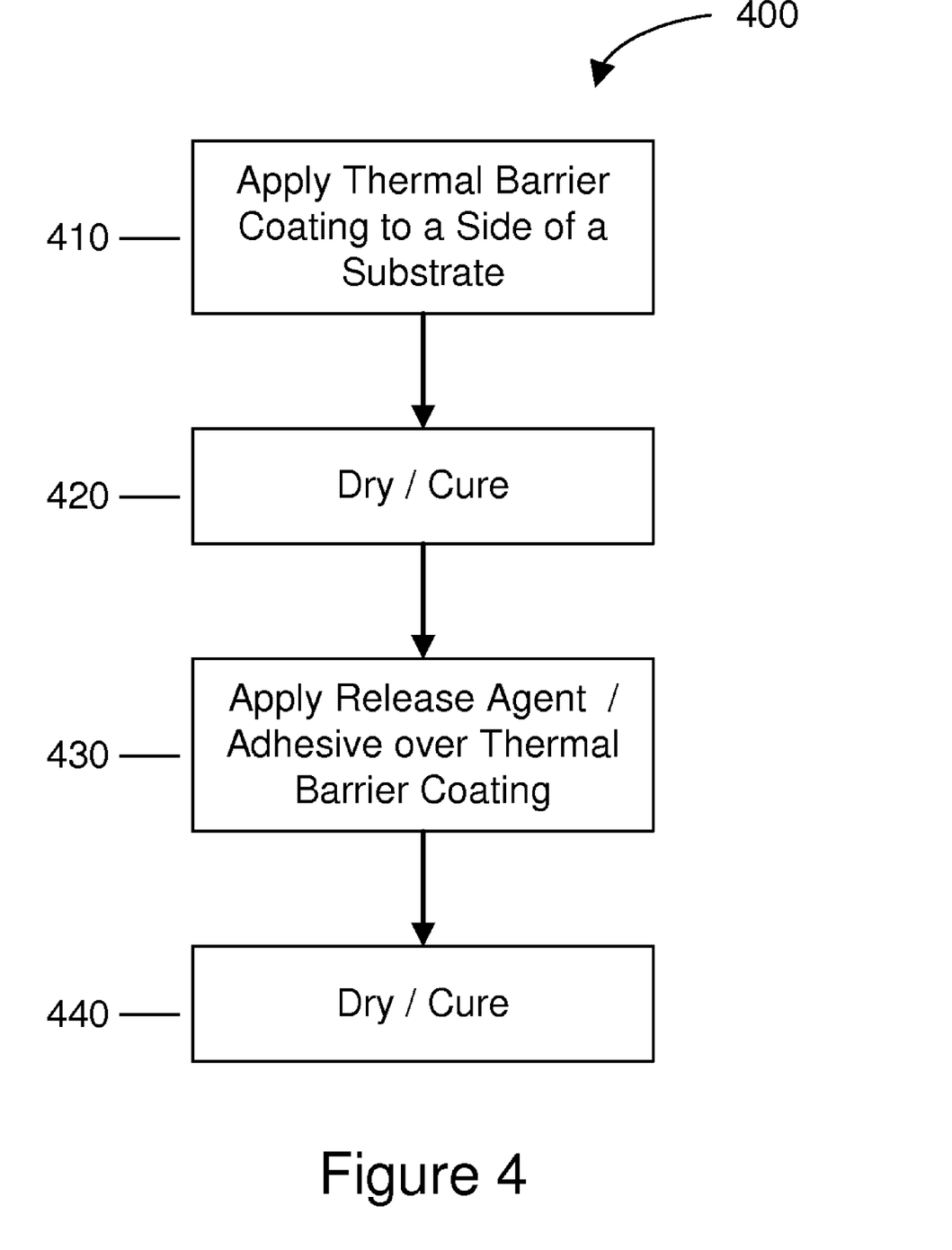
FIG. 4 illustrates a first method of making a thermal label.

FIG. 4 illustrates a method 400 of making one or more portions of a two-sided thermal label 200 and/or a three-ply, two-sided thermal label 300. At step 410 a thermally barrier coating 216, 226, 228 is applied to a side of a provided substrate, such as any of the substrates 110, 120, 150 of FIGS. 2A, 2B, and 2C, and 3A, 3B, and 3C. At step 420 such thermal barrier coating is dried and/or cured. At step 530, a release agent 140, 170 and/or adhesive 130, 160 is applied to over the thermal barrier coating, and subsequently dried and/or cured at step 540. Depending on the embodiment, a substrate 110, 120, 150 including one or more thermally sensitive coatings 116, 126 on a first and/or a second side thereof may be provided and processed as provided for in the method of FIG. 4, including application of one or more thermal barrier coatings 216, 226, 228, release agents 140, 170 and/or adhesives 130, 160 on either or both sides thereof.

Figure 5:
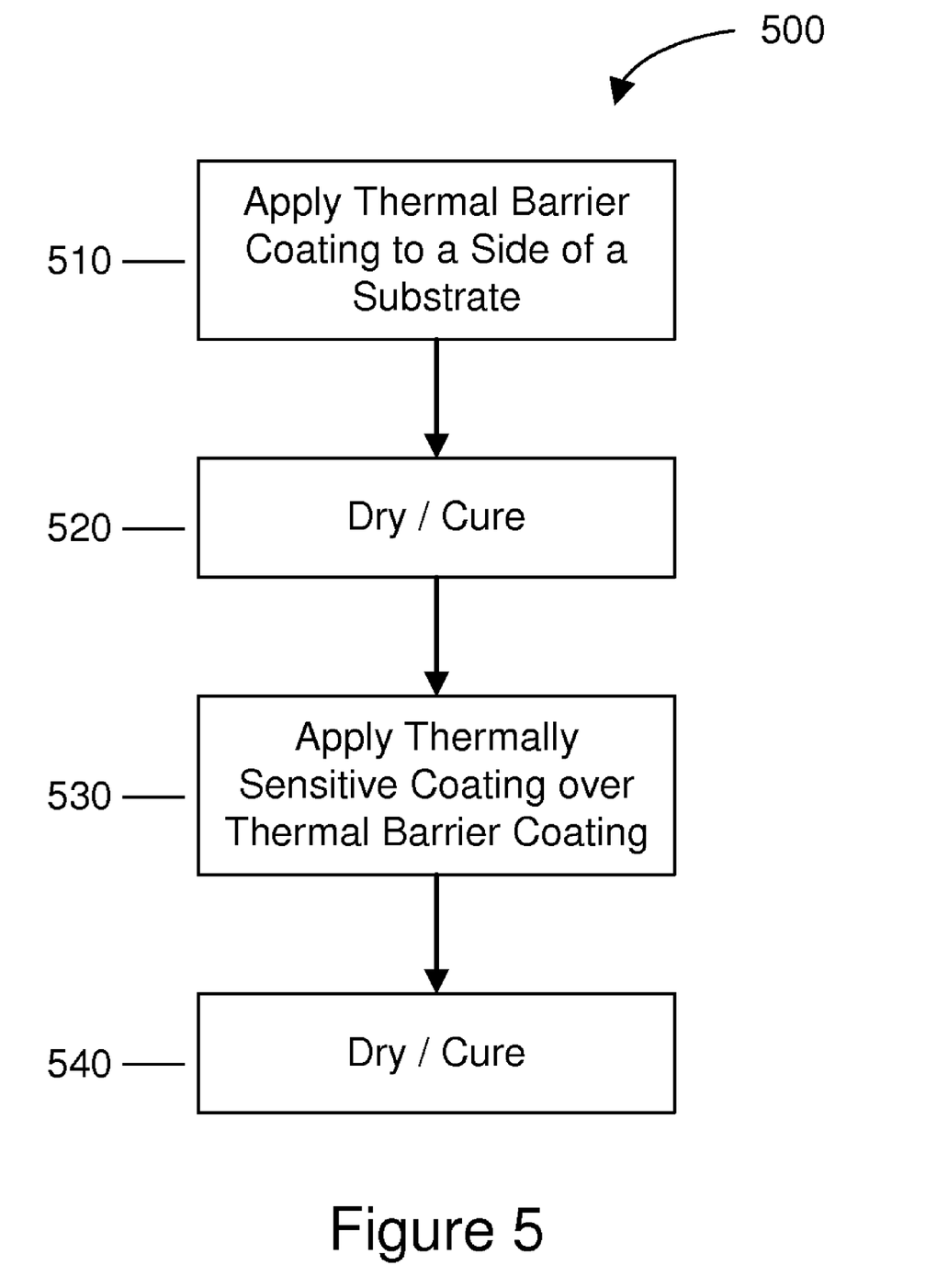
FIG. 5 illustrates a second method of making a thermal label.

FIG. 5 illustrates a second method 500 of making one or more portions of a two-sided thermal label 200 and/or a three-ply, two-sided thermal label 300. At step 510 a thermally barrier coating 216, 226, 228 is applied to a side of a provided substrate, such as any of the substrates 110, 120, 150 of FIGS. 2A, 2B, and 2C, and 3A, 3B, and 3C. At step 520 such thermal barrier coating is dried and/or cured. At step 530, a thermally sensitive coating 116, 126 is applied to over the thermal barrier coating, and subsequently dried and/or cured at step 540. Depending on the embodiment, a substrate 110, 120, 150 including one or more release agents 140, 170 on a side (preferably a side opposite the side where the thermally sensitive coating will be applied) thereof may be provided and processed as provided for in the method of FIG. 5, including application of one or more thermal barrier coatings 216, 226, 228, and one or more thermally sensitive coatings thereto. Likewise, in various embodiments, a substrate 110, 120, 150 without an adhesive 130, 160 and/or a release agent 140, 170 may be provided and processed as provided for in FIG. 5, wherein one or more adhesives 130, 160 and/or release agents 140, 170 may subsequently be applied and dried and/or cured, preferably on a side opposite the side where the thermally sensitive coating is applied.

Irrespective of the embodiment, it should be noted that printing, such as but not limited to intaglio, lithographic, and/or flexographic printing, may be provided under and/or on top of a thermal barrier coating 216, 226, 228 such that is may be observed and/or read through the thermal barrier coating 216, 226, 228 and/or one or more coatings provided thereon including, but not limited to, one or more thermally sensitive coatings 116, 126, adhesives 130, 160 and/or release agents 140, 170. Such printing may be provided to, for example, maximize use of otherwise un- or under-utilized portions of a two-sided thermal label 200, 300, including regions where thermally sensitive coatings 116, 126 are not provided such as, but not limited to, a back side 114, 124 of a first and/or a second substrate 110, 120 and/or either or both sides 152, 154 of a third substrate 150 of a three-ply, two-sided thermal label 300. In addition, such printing may serve a security or authenticity function indicating, for example, ownership and/or origin of the media 200, 300 and/or an object associated therewith. Variations including provision of standard terms and conditions of sale and/or use, legal notices, warrantee information, shipper/vendor information, and the like, may also be so printed.

In addition, it should be noted that, depending on the use and/or embodiment, one or more of a thermally sensitive coating 116, 126, thermal barrier coating 216, 226, 228, adhesive 130, 160, and/or release agent 140, 170 may be applied in a flood, spot, stripe or other pattern coating. For example, in some embodiments, it may be desired or required to pattern the adhesive in from the edge of the laminate in order to prevent, inter alia, adhesive from squeezing out during processing and/or use. Likewise, in some embodiments, patterns of adhesive may be used to give the resulting labels special features such as having a tear away portion that has no adhesive. Further, in all cases it may be desirable to match a particular thermally sensitive, thermal barrier, adhesive and/or release agent spot, stripe and/or pattern coating to that of an associated coating (e.g., a thermal barrier in the case or any of a thermally sensitive, adhesive, and/or release coating, and/or a release agent in the case of an adhesive) to provide desired functionality and performance.

In addition, or as an alternative, to use of a thermal barrier coating 216, 226, 228, in some embodiments, a high volume of warm air (e.g., of insufficient temperature to adversely impact a particular, utilized thermally sensitive or other coating) may be blown over a water based coating at a high velocity (e.g., typically, 300-500 feet per minute; preferably, ~400 feet per minute), thereby providing for efficient drying of the coating at a small dwell time (e.g., typically, 2-6 seconds; preferably, ~2 seconds) without adverse consequences (e.g., imaging a thermally sensitive coating). This drying technique forces a large amount of warm air over a water based coating, thereby facilitating quick evaporation of the water. Likewise, this method does not damage an associated thermally sensitive coating (which may also be the coating being dried) as the temperature is below the threshold of chemical activation of the thermally sensitive components (e.g., leuco dye, developer and/or sensitizer).

Further, in other embodiments, radio frequency (RF) technology can be used to dry and/or cure thermally sensitive and/or other (e.g., adhesive, release agent, and/or thermal barrier) coatings without degradation to the substrate and/or any previously applied coatings. RF dryers can efficiently cure coatings at faster rates of speed than other technologies, such as hot air and/or infrared heating, without degeneration of the substrate and or coatings.

RF dryers generate an alternating electric field between two electrodes, reversing polarity of targeted molecules, such as water, as they pass through. The alternating energy results in rapid and continuous reorientation of the target molecules. Friction from this molecular movement causes rapid heating within the targeted material mass. The accelerated speed at which the heat is generated and the fact that the subject molecules are selectively heated while other materials are not, yields drying and/or cure at overall, relatively cool temperatures. This results in reduced processing time, consistent quality and non-damaged product.

In one embodiment, an RF dryer operating at a frequency of approximately 40 MHz (preferably 40.68 MHz) is provided for selectively drying a water based coatings, such as one or more thermally sensitive coatings 116, 126 without pre-reacting the thermally sensitive constituents.

In the foregoing description, various features are grouped together in a single embodiment for the purpose of streamlining the disclosure. Likewise, various features are described only with respect to a single embodiment in order to avoid undue repetition. This method of disclosure is not to be interpreted as reflecting that the claimed embodiments should have more features than are expressly recited in each claim. Rather, as the following claims reflect, inventive subject matter may be found in less than all features of a single disclosed embodiment. Likewise, inventive subject matter may be found in a combination of features from multiple disclosed embodiments. Thus the following claims are hereby incorporated into the description of the embodiments, with each claim standing on its own as a separate exemplary embodiment.

What is claimed is:

1. A direct thermal label comprising:
   a substrate having a thermally sensitive coating on at least a first side thereof; and
   a thermal barrier coating provided between the substrate and the thermally sensitive coating,
   wherein said thermal barrier coating comprises latex of approximately 80% on a dry mass basis, and
   wherein said thermal barrier coating comprises polymeric hollow spheres of approximately 20% on a dry mass basis.

2. The direct thermal label of claim 1, further comprising:
   a second substrate having a second thermally sensitive coating on at least a first side thereof,
   wherein a thermal barrier coating is optionally provided between the second substrate and the second thermally sensitive coating.

3. The direct thermal label of claim 2, wherein the first and second substrates further include a thermally sensitive coating on the second sides thereof.

4. The direct thermal label of claim 3, wherein respective thermal barrier coatings are provided between the thermally sensitive coatings on the second sides of the first and second substrates and the respective first and second substrates.

5. The direct thermal label of claim 2, further comprising:
   a first adhesive,
   wherein the second side of the first substrate is releasably attached to the second side of the second substrate via the first adhesive.

6. The direct thermal label of claim 5, further comprising:
   a release agent,
   wherein the release agent is secured to the second side of the second substrate.

7. The direct thermal label of claim 2, further comprising:
   a third substrate,
   wherein a first side of the third substrate is releasably attached to a second side of the first substrate and a second side of the third substrate is fixably attached to a second side of the second substrate.

8. The direct thermal label of claim 7, wherein the third substrate includes a third thermally sensitive coating on at least a first side thereof.

9. The direct thermal label of claim 2, further comprising:
   a third substrate,
   wherein a first side of the third substrate is releasably attached to a second side of the first substrate and a second side of the third substrate is releasably attached to a second side of the second substrate.

10. The direct thermal label of claim 9, wherein the third substrate includes a third thermally sensitive coating on a first and a second side thereof.

11. The direct thermal label of claim 2, wherein the second substrate comprises vellum.

12. The direct thermal label of claim 1, wherein the first substrate further includes a thermally sensitive coating on the second side thereof.

13. The direct thermal label of claim 12, wherein a thermal barrier coating is provided between the thermally sensitive coating on the second side of the first substrate and the first substrate.

14. The direct thermal label of claim 1, wherein the substrate comprises glassine.

* * * * *